United States Patent
Twerdochlib

Patent Number: 5,865,598
Date of Patent: Feb. 2, 1999

[54] HOT SPOT DETECTION SYSTEM FOR VANES OR BLADES OF A COMBUSTION TURBINE

[75] Inventor: Michael Twerdochlib, Oviedo, Fla.

[73] Assignee: Siemens Westinghouse Power Corporation, Orlando, Fla.

[21] Appl. No.: 886,877

[22] Filed: Jul. 2, 1997

[51] Int. Cl.[6] ............ F01B 25/26; F03B 11/00; G01N 17/00
[52] U.S. Cl. .................. 415/118; 415/175; 415/178; 73/86
[58] Field of Search ................... 415/115, 116, 415/118, 175, 177, 178, 179; 416/95; 73/86

[56] References Cited

U.S. PATENT DOCUMENTS

| | | | |
|---|---|---|---|
| 4,204,428 | 5/1980 | Webb et al. | 73/399 |
| 4,209,348 | 6/1980 | Duhl et al. | |
| 4,306,835 | 12/1981 | Hurley | 415/118 |
| 4,328,462 | 5/1982 | Jensen | 73/86 X |
| 4,509,332 | 4/1985 | Bellows | 415/118 X |
| 4,595,298 | 6/1986 | Frederick | 415/118 X |
| 4,741,203 | 5/1988 | Willaman et al. | 415/118 X |
| 4,774,150 | 9/1988 | Amano et al. | 415/118 X |
| 5,181,536 | 1/1993 | Argyle et al. | 73/86 X |
| 5,211,677 | 5/1993 | Sargeant et al. | 73/86 X |
| 5,262,245 | 11/1993 | Ulion et al. | |
| 5,460,033 | 10/1995 | Vander Velde | 73/86 |
| 5,552,711 | 9/1996 | Deegan et al. | 415/118 X |
| 5,554,318 | 9/1996 | Neumann et al. | 252/301.19 |
| 5,566,626 | 10/1996 | Schaefer et al. | 73/86 X |

FOREIGN PATENT DOCUMENTS 57-26300   2/1982   Japan ................. 415/118

Primary Examiner—John E. Ryznic

[57] ABSTRACT

This invention includes a detection system that can determine if a turbine component, such as a turbine vane or blade, has exceeded a critical temperature, such as a melting point, along any point along the entire surface of the vane or blade. This system can be employed in a conventional combustion turbine having a compressor, a combustor and a turbine section. Included within this system is a chemical coating disposed along the entire interior surface of a vane or blade and a closed loop cooling system that circulates a coolant through the interior of the vane or blade. If the temperature of the vane or blade exceeds a critical temperature, the chemical coating will be expelled from the vane or blade into the coolant. Since while traversing the closed loop cooling system the coolant passes through a detector, the presence of the chemical coating in the coolant will be sensed by the system. If the chemical coating is detected, this indicates that the vane or blade has exceeded a critical temperature.

20 Claims, 4 Drawing Sheets

HOT SPOT DETECTION SYSTEM FOR VANES OR BLADES OF A COMBUSTION TURBINE

The U.S. Government has a paid-up license in this invention and the right in limited circumstances to require the patent owner to license others on reasonable terms as provided for by the terms of contract No. DE-FC21-95MC32267 awarded by the Department of Energy.

BACKGROUND OF THE INVENTION

This invention relates to a system for detecting high temperature areas or "hot spots" on either stationary vanes or rotating blades of a combustion turbine.

As will be appreciated by one skilled in the art, a turbine generally has a rotor, rotating blades affixed to the rotor, stationary vanes affixed to an outer cylinder of the turbine, an inlet for in taking a hot fluid and an outlet for exhausting the fluid. The hot fluid, which is usually either steam or gas, flows into the intake, over the exterior of the rotating blades and stationary vanes and through the outlet. As the fluid flows through the turbine, it drives the rotating blades. Since the rotating blades are connected to the rotor, as they rotate the rotor also rotates.

In order to increase the efficiency of turbines, they are currently being designed to operate at such high temperatures that the vanes and blades of a turbine must be cooled to prevent thermal damage. Potentially, "hot spots" (localized areas of high temperature) in a portion of a vane or blade can occur as the hot fluid flows over their exterior. Currently, in "closed-loop" cooling systems the blades or vanes are cooled by sending a cooling medium through their interior. Additionally, the vanes and blades are protected from heat associated with these high temperatures by a thin thermal barrier coating (TBC) applied to their exterior. This thin thermal barrier coating provides a layer of insulation to reduce or minimize heat transfer from the hot gas to the vanes or blades. This prevents hot spots from developing. If a hot spot develops, the TBC will be expelled from the vane or blade and it will be exposed to the hot gas. Exposure to the hot gas can cause a vane or blade to reach high temperatures and to suffer thermal damage.

In order to determine if a vane or blade has reached a high temperature, the temperature of each of the vanes and blades is monitored. One method of monitoring the temperatures of the vanes and blades includes intrusive monitoring. For example, temperature detectors such as thermocouples or resistance temperature detectors (RTDS) can be placed in the turbine to monitor the temperature of the vanes and blades at various locations. Intrusive monitoring however, has a significant disadvantage; it does not monitor the temperature along the entire surface of a vane or blade. Rather, it merely monitors the temperature at discrete locations.

Monitoring the temperature over the entire surface of turbine components, such as a vane or blade, is particularly important because these components are designed to have a relatively even temperature distribution. As will be appreciated by those skilled in the art, turbine components are designed to have an even temperature distribution in order to reduce the emission of nitrogen oxide (NOX). Therefore, the likelihood that a specific location will reach a hot spot is not significantly different than the likelihood of another location becoming relatively hot. Consequently, with an intrusive temperature monitoring system a component may reach an excessive temperature in a region not directly monitored by a temperature detector. If this occurs, the TBC could breakdown and a vane or blade could be damaged. Due to the relatively large and complex nature of the blades and vanes, their support structures and other aspects of a turbine, it is impracticable to provide a global system of detection (one that monitors the temperature over the entire surface of the components) with an intrusive monitoring technique. Thus, an improved temperature detection system is needed that monitors the temperature over the entire surface of a vane or blade.

SUMMARY OF THE INVENTION

The present invention includes a detection system that detects whether a turbine vane or blade, disposed in a combustion turbine having a compressor, a combustor and a turbine section, has reached a critical temperature at any point along a surface of the vane or blade. This invention is described below with reference to a stationary turbine vane, but a rotating blade could be employed in the system as well. Employed in this detection system is a chemical coating disposed on an interior surface of the vane. This chemical coating may be adamantyl imide, n-dodecyl imide, cyclo dodecyl imide, cyclo-oceyl imide or ethexyl amic acid. If a vane reaches a critical temperature, this coating is expelled from the vane in the form of a particulate. A detector may be employed in this system to determine if a particulate has been expelled. If a particulate is detected, this indicates that a vane has reached a critical temperature. In comparison, if the vane has not reach a critical temperature, the chemical will not be expelled from the vane.

The turbine vane cooling system may also have a heat exchanger and a pump in fluid communication with the interior of the vane. The vane cooling system functions to continuously circulate a cooling medium through the interior of the vane and thereby cool the vane. The detector mentioned above may be an ionizing chamber. If the vane reaches its critical temperature at any point along the interior of the vane, the chemical coating in the form of a particulate will be expelled from the vane into the coolant and detected by the detector.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENTS

Figure 1:
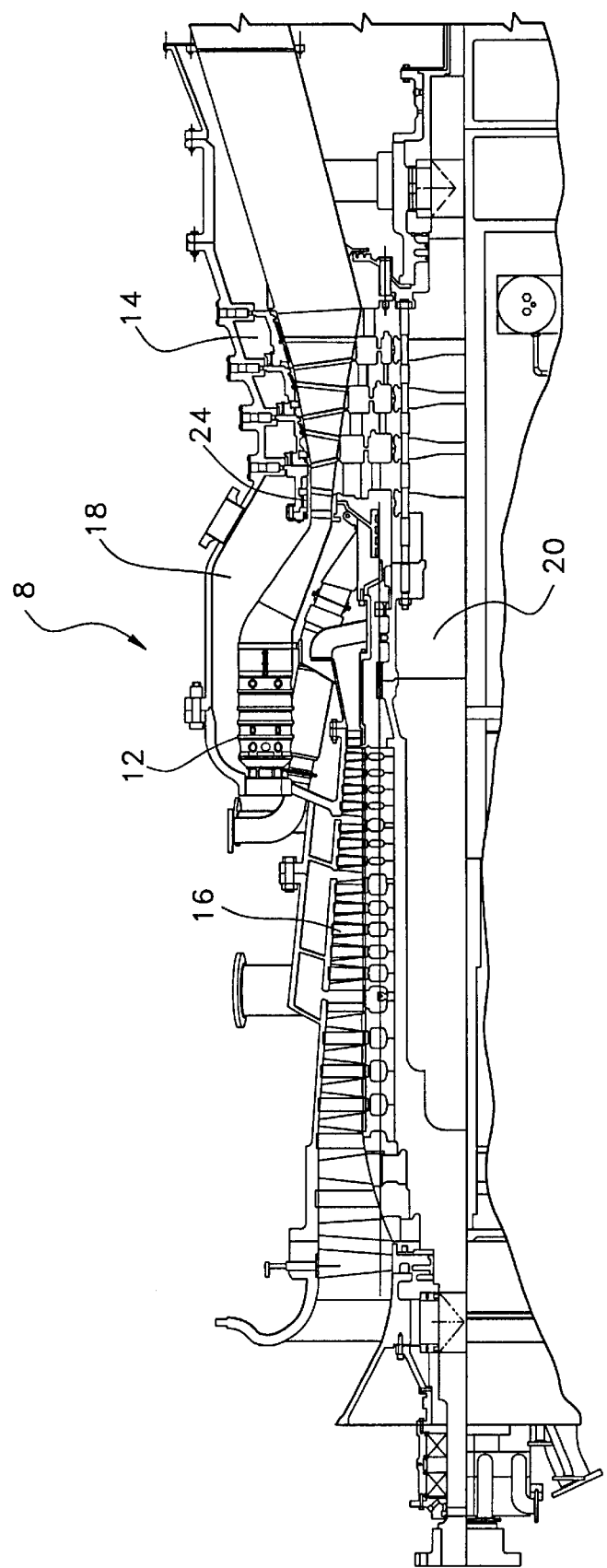
FIG. 1 is a diagrammatical view of a combustion turbine according to the prior art.

Referring now to the drawings, wherein like reference numerals designate corresponding structure throughout the views, and referring in particular to FIG. 1, a gas turbine 8 generally includes a compressor 16, a turbine section 14, a combustor chamber 18 and a combustor 12. Compressed air from the compressor 16 is exhausted into the combustor chamber 18. From the chamber 18, the air enters the combustor 12 where fuel, such as natural gas, is burned. Hot gas exits the combustor 12 and travels through the turbine section 14. In the turbine section 14 the gas expands, and the energy of the hot gas is converted into work to drive the rotor shaft 20. More specifically, as the rotor shaft 20 turns it may drive the compressor 16 and another load (not shown). This load is typically an electrical generator. This turbine 8 is prior art and may employ the temperature detection system 22 and the turbine vane 24 or balde 23 of this invention described below.

As depicted in FIG. 1, a plurality of rotating turbine blades 23 are disposed within the turbine section 14. These blades 23 are affixed to the rotor 20 in a conventional manner. The turbine also has a plurality of stationary vanes 24 disposed around the circumference of the rotor 20. Typically, these blades 23 and vanes are constructed from a nickel alloy. Based on the loading conditions the shapes of the vanes and blades and other parameters, the vanes or blades may fail if a failure temperature is reached. More particularly, since material properties, for example yield strength, vary inversely with temperature, a vane or blade may fail if the temperature increases to the point where its material properties are significantly reduced. In a preferred embodiment such as in a turbine produced by Westinghouse Electric Corporation of Pittsburgh, Pa. identified by Model No. 501G, the failure temperature of the vanes and blades is about 1800°–2000° F.

Figure 2:
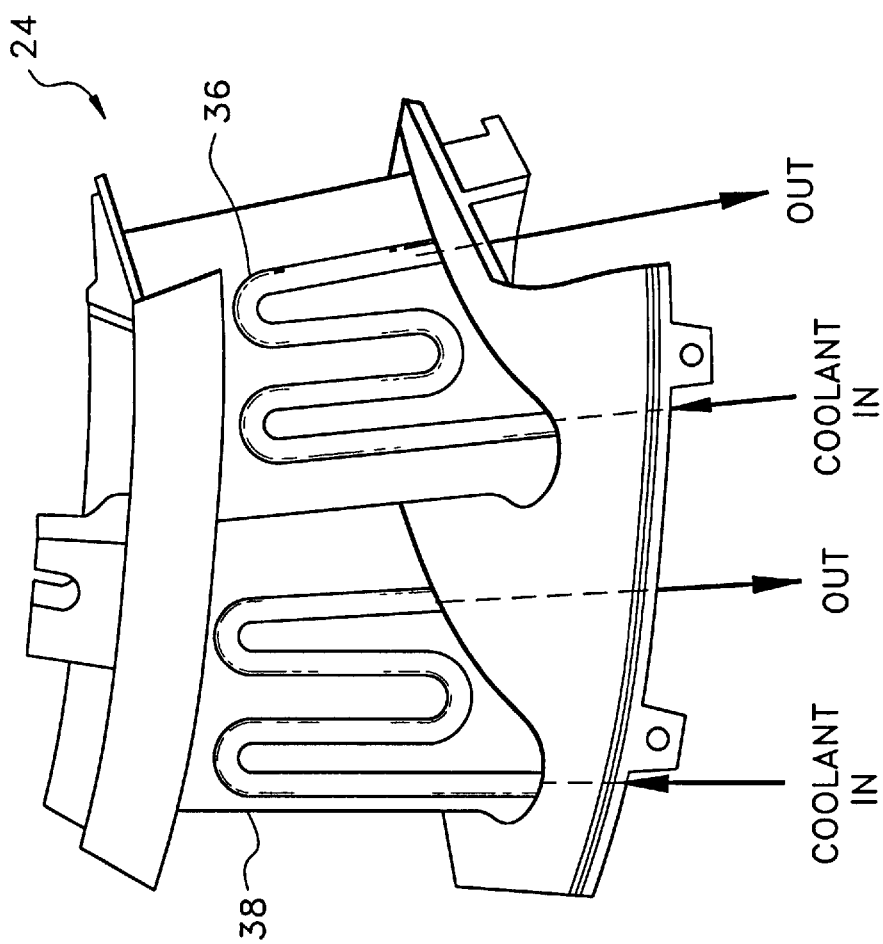
FIG. 2 is a turbine vane according to a preferred embodiment of this invention.

As depicted in FIG. 2, the turbine vane 24 or blade 23 has an interior 36 and an exterior 38. Although only one vane 24 is depicted in FIG. 2, it will be understood that a turbine 8 has a plurality of similar vanes 24 or blades 23. Hot gas from the combustor 12 flows over the exterior 38 of the vane 24 during operation of the turbine 8. Since this gas is relatively hot, it can cause thermal damage to the vane 24. To prevent thermal damage, the exterior 38 of the vane 24 is coating with a thin barrier coating (TBC). The thin barrier coating provides a layer of insulation that protects the vane 24 from reaching relatively high temperatures. As is known in the art, this coating may be a combination of a ceramic material and a metallic material as disclosed in U.S. Pat. No. 4,209,348 issued to Duhl et al. or a superalloy substrate, a thin adherent oxide scale on the surface of the substrate and a ceramic coating on the surface of the scale as disclosed in U.S. Pat. No. 5,262,245 issued to Ulion et al., both of which are hereby incorporated herein by reference. Other known materials may be used to form the TBC. The melting point of the TBC is dependent on the type of material employed. For example, the TBC taught by Duhl has a melting point of about 2300° F. If the melting point of the TBC is reached anywhere along the exterior 38 of the vane 24, the TBC will melt and the vane 24 will not be thermally insulated at this "hot spot." If this occurs, thermal damage to the vane 24 may result as the temperature of the vane 24 increases due to contact with the hot gas. Although this invention is described with reference to the turbine vanes 24, a turbine blade can be employed in this invention. In such an embodiment, the blades are merely substituted for the vanes in the description of the invention provided above and below.

Disposed on the interior surface of the vane 24 may be a detection material. Preferably, this detection material is applied as a thin coating along the entire interior surface of the vane 24. The detection material may be n-dodecyl imide, cyclo dodecyl imide, cyclo-oceyl imide or ethexyl amic acid or adamantyl imide. Even more specifically, these materials may be those manufactured by Environment One Corporation of Schenectady, N.Y. 12301 identified as Part Numbers A-1012A-273, A 1012A-274, A1012A-275, A1012A-276 and A-1012A-277 respectively. Other similar materials manufactured by others may also be employed. When heated to about 1700°–1800° F., these materials form a particulate. The temperature at which each of these chemicals forms a particulate is below the melting point and the failure point of the vane. Consequently, if the vane 24 is elevated in temperature the detection material will form a particulate before thermal damage to the vane 24 occurs. Before applying the detection material to the vane, it is mixed with a high temperature paint or binding medium. Such high temperature paints are commonly used in turbines. Preferably, the detection material is highly concentrated within the paint. After forming this mixture of paint and detection material it is applied to the inner surface of the vane 24. In a preferred embodiment, this mixture is applied as a relatively thin coating and is sprayed onto the vane in a conventional manner. The thin coating of paint and detection material may have a thickness of about 0.001 inches. In another preferred embodiment, this mixture is applied in small drops, or speckles, with each speckle being about a half a millimeter in diameter and spaced about one centimeter from the other speckles. This mixture of paint and detection material decomposes at about 1700°–1800° F. as described above to form a particulate.

As discussed above, if temperatures reach a certain point, the thermal barrier coating will be expelled from the vane 24. If this occurs, the temperature of the vane will increase and the temperature at which the detection material forms a particulate will be reached. If this occurs, the detection material will be expelled from the interior 36 of the vane 24.

Figure 3:
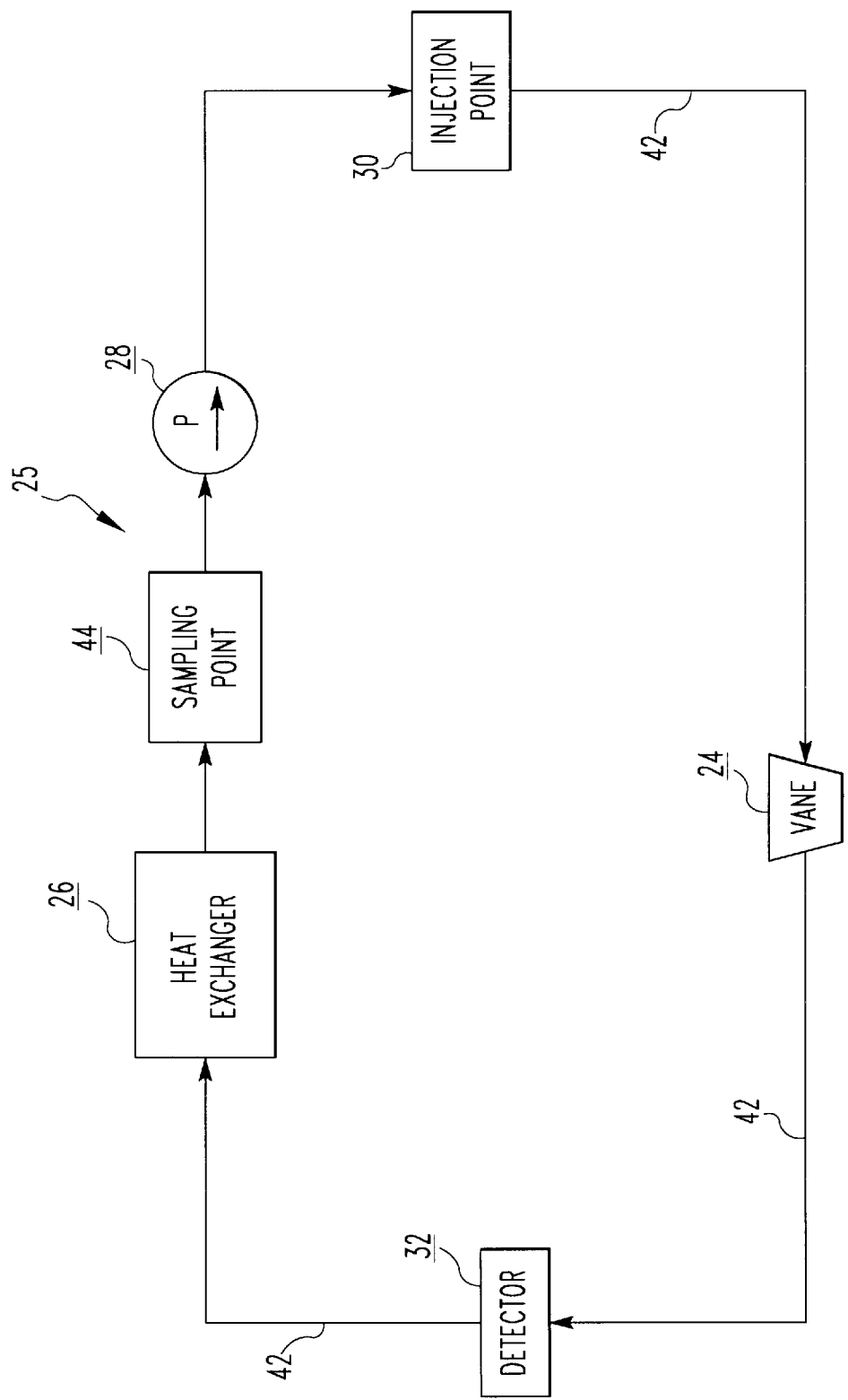
FIG. 3 is a schematic diagram of a temperature detection system according to a preferred embodiment of this invention.

Depicted schematically in FIG. 3 is a global detection system 25 according to the present invention for detecting whether the temperature of a turbine vane 24 has exceeded a critical temperature. The critical temperature may be the failure temperature of the vane 24, and as mentioned above in a preferred embodiment this temperature is about 1800°–2000° F. However, it may also be selected below these temperatures to provide for a margin of safety. For instance, in the preferred embodiment identified above, the critical temperature may be about 1700°–1800° F.

In this preferred embodiment, the global detection system 25 includes a closed loop vane cooling system. Included within this system is a turbine vane 24, a heat exchanger 26, a pump 28, an injection point 30 and a detector 32. Although, only one vane 24 is depicted in FIG. 2, it will be appreciated that the system may cool all of the vanes 24 of the turbine 8. As depicted schematically in FIG. 3, these components are connected to each other by conduits 42. These conduits 42 may be pipes, tubes or similar connecting structures. Together these components form a "closed-loop" cooling system. The system 25 is referred to as closed-loop because a coolant flows through the components in a repetitive fashion and does not exit the system. In contrast, in an open-loop system a coolant is exhausted through apertures (not shown) in the vane and into the exhaust gas after passing through the interior of a vane a single time. In such a system the coolant does not traverse a repetitive path.

The pump 28 is of known type and is used to pressurize the coolant and thereby provide a driving force for the coolant to flow through the vane cooling system 25. The heat exchanger 26 is also of conventional type and functions to transfer heat from the coolant to another medium. In operation coolant flows through the vane cooling system and heat is transferred to the coolant from the vane 24. After flowing through the vane 24, the coolant then flows through the heat exchanger 26 and heat is transferred from the coolant to another medium. After being cooled, the coolant is ready to again absorb heat from the vane 24.

Although in the most preferred embodiment of this invention, the sampling point 44 is disposed between the heat exchanger 26 and the pump 28, the sampling point may be disposed in a variety of different positions in the detection system 22. Preferably, however, the sampling point 44 is downstream of the heat exchanger 26 so that the coolant has a relatively low temperature upon sampling. At the sampling point 44, samples of the coolant can be taken and tested to determine if the temperature of the vane 24 has reached a critical temperature. Such tests may include filtering the coolant and using a mass spectrometer to identify the particulate.

As depicted schematically in FIG. 3, the detection system 22 may also include an injection point 30. Although the injection point may be disposed in a variety of locations, in the most preferred embodiment the injection point is disposed between the pump 28 and the vane 24. At the injection point chemicals or other substances may be injected into the detection system 25. For instance, a chemical medium can be injected into the system in order to determine if the vane 24 has been exposed to a critical temperature.

This chemical injected into the coolant may be a mixture of a detection material such as n-dodecyl imide, cyclo oceyl imide, cyclo dodecl imide, ethexyl amic acid or adamantyl imide and a binding material as described above with reference to the detection material. However, other similar materials may be used. These chemicals can be used to determine if the vane 24 has reached a critical temperature because if the vane 24 has reached a critical temperature, the chemicals will form a particulate.

Preferably, the detection system also employs a detector 32 as depicted schematically in FIG. 2. In the most preferred embodiment, the detector 32 is an ionization chamber. Since ionization chambers are well known in the art, the details of one type, but not the only type of ionization chamber, that may be employed in this invention will be discussed only briefly. In a preferred embodiment, the ionization chamber includes a relatively weak radioactive source that constantly emits electrons into a stream of coolant moving through the detector. Due to the small difference in electric potential, the electrons drift across the coolant. As this occurs, an electrical current is generated and is measured by an amp meter, such as an electrometer. If particulate is present in the coolant, the electrons will attach to the particulate. As this occurs, the amount of electrons that drift across the coolant decreases and the measured current decreases. This decrease in electrical current is, therefore, indicative of particulate being present in the coolant and the presence of a hot spot. Therefore, if the detection material in the form of a particulate is expelled from the vane 24 and into the cooling system 25 or the injection material is inserted into the system 25 and it forms a particulate, the detector 32 will note the presence of a particulate, which is indicative of a hot spot.

In operation, the detection system operates as follows. The coolant is propelled by the pump through the vane 24. After being heated in the vane 24, the coolant travels through the detector 32 and the heat exchanger 26. In the heat exchanger 26, the coolant transfers its heat to another medium. If a critical temperature is reached at any point along the exterior of the vane, the TBC will be expelled from this point. Without the insulation proved by the TBC, this location will increase in temperature, and the detection material will be expelled in the form of a particulate from the interior of the vane and into the coolant. The particulate will then travel through the system to the detector 32. At the detector 32, the presence of the particulate will be observed. Alternatively, its presence will be noted upon sampling the coolant.

If particulate is detected, the injection material may be injected into the coolant at the injection point 30. The coolant containing the injection material then travels to the vane 24. If the temperature of the coolant is high enough the injection material will undergo a chemical reaction and form a particulate. At the sampling point, the coolant can be sampled in order to detect whether the injected chemical underwent a transformation indicating that it was exposed to the critical temperature.

Since the coolant is in contact within the entire interior surface 36 of the vane 24, testing the coolant for either particulates expelled from the vane 24 or a chemical injected into the detection system 22 provides a global detection technique. As mentioned above, in the prior art intrusive temperature monitoring techniques were utilized. Intrusive techniques provide a temperature indication at discrete locations and do not provide precise temperature indication of other areas of the blade. Thus, this invention has the significant advantage of being able to detect if a critical temperature has been reached at any point along the vane surface.

Figure 4:
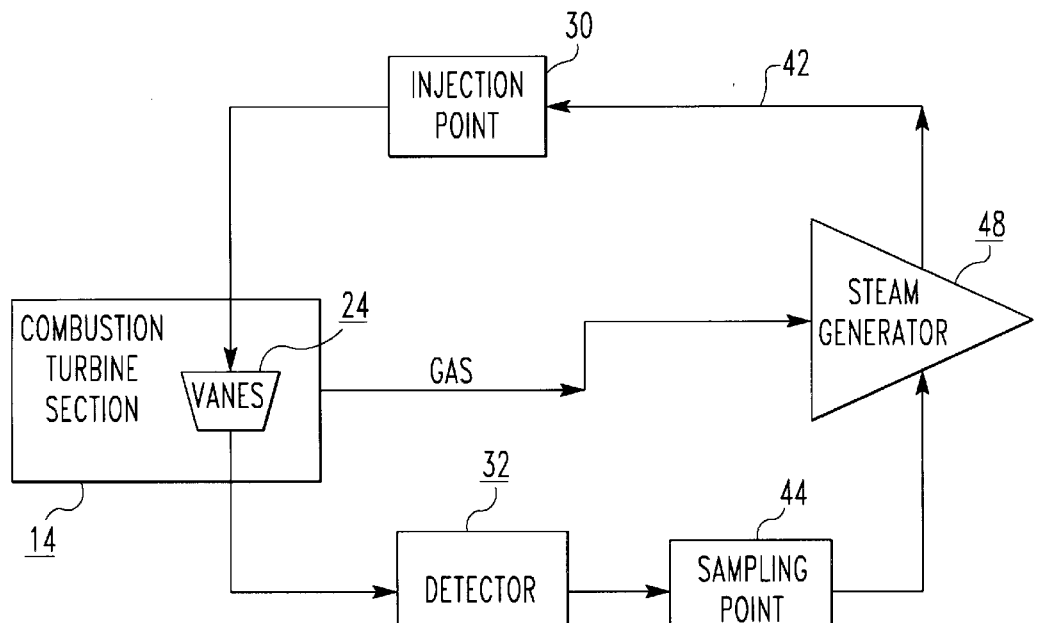
FIG. 4 is a schematic diagram of a temperature detection system according to another preferred embodiment of this invention.
Figure 5:
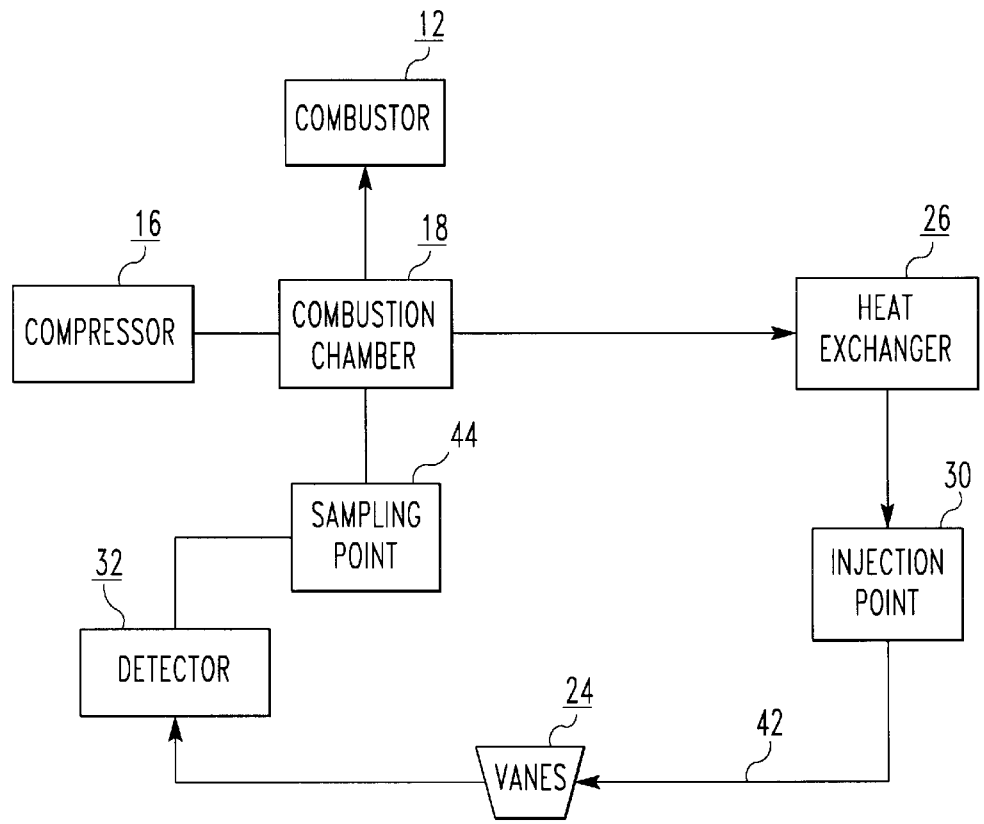
FIG. 5 is a schematic diagram of a temperature detection system according to another preferred embodiment of this invention.

Preferably, the coolant in this closed loop system 25 is air. However, it may be water or another cooling medium, such as steam. As shown in FIG. 4, an alternative embodiment of this invention employs steam as a coolant. In this embodiment, the cooling system includes a steam generator 48, and a detector 32. Steam is produced in the generator as heat is transferred from the hot combustion turbine section 14 exhaust gas. The steam then flows through conducts 42 to the vanes 24 and to the detector 32. As illustrated, the system may also employ a sampling point 44 and an injection point 30. This system operates similarly to that described above.

In an alternative embodiment, the vane cooling system uses air as a coolant. This air is supplied by the compressor 16. Before traversing through the vanes 24, the air is cooled by a heat exchanger 26. After being cooled, the air travels through the vanes 24 and is send to the combustion chamber 18. In this embodiment the detector 32 is disposed between the vane and the combustion chamber 18. Also included within the system 25 is a sampling point 44 and an injection port 30. This system operate similarly to those embodiments described above.

Although this invention encompasses two detection means, detecting if a coating has been expelled from the vane and if an injected chemical has undergone a chemical reaction, they can be employed either individually or together. For example, a vane detection system may employ only one means of detection. Alternatively, a vane detection system may, as in the preferred embodiment, utilize both means of detection. In this instance the second means, the chemical injection means can be used as a verifying means. Furthermore, as mentioned above, although a majority of this discussion referred to a system employing a stationary turbine vane 24, a rotating turbine blade 23 could be as well. In order to construct such a system, a blade 23 is merely substituted for the vane 24 in the systems described above.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

I claim:

1. A detection system that detects whether a turbine component has reached a critical temperature at any point on a surface of the component, comprising:

a chemical coating disposed on an interior of the component that is adapted to be expelled from the component, in the form of a particulate if the component reaches a temperature that is approximately equal to the critical temperature.

2. The system of claim 1, further comprising a component cooling system comprising a heat exchanger and a pump in flow communication with the interior of the component, and the coating being adapted to be expelled into the cooling system if the component reaches a temperature that is approximately equal to the critical temperature.

3. The system of claim 1, wherein the critical temperature is below a melting point of the component.

4. The system of claim 1, wherein the component further comprises a thermal barrier coating on the exterior of the component that thermally insulates the component.

5. The system of claim 2, wherein the component cooling system further comprises an ionizing chamber in flow communication with the interior of the component that detects if particulate has been expelled from the component.

6. The system of claim 1, wherein the chemical coating comprises adamantyl imide.

7. The system of claim 1, wherein the chemical coating comprises n-dodecyl imide.

8. The system of claim 2, wherein the cooling system further comprises an injection port such that an injection chemical that forms a particulate if the component reaches a temperature that is approximately equal to the critical temperature can be injected into the cooling system and a sampling point such that the cooling system can be sampled to determine if the injection chemical formed a particulate.

9. A detection system that detects whether a turbine component has reached a critical temperature at any point on a surface of the component, comprising:

a chemical coating disposed on an interior of the component; and a component cooling system comprising a heat exchanger and a pump in flow communication with the interior of the component, and the chemical coating being adapted to be expelled into the cooling system in the form of a particulate if the component reaches a temperature that is approximately equal to the critical temperature.

10. The system of claim 9, wherein the critical temperature is below a melting point of the component.

11. The system of claim 9, wherein the component further comprises a thermal barrier coating on the exterior of the component that thermally insulates the component.

12. The system of claim 9, wherein the component cooling system further comprises an ionizing chamber that detects if particulate has been expelled from the component.

13. The system of claim 9, wherein the chemical coating comprises adamantyl imide.

14. The system of claim 13, wherein the chemical comprises n-dodecyl imide.

15. The system of claim 9, wherein the cooling system further comprises an injection port such that an injection chemical can be injected into the cooling system and a sampling point such that the cooling system can be sampled to determine if the injection chemical formed a particulate.

16. A method of detecting whether a turbine component has reached a critical temperature at any point on a surface of the component, comprising:

cooling the component by exposing an interior of the component to a cooling medium; and passing the cooling medium through a detector that determines if a chemical in the form of a particulate that forms at about the critical temperature is present in the cooling medium.

17. The method of claim 16, wherein the chemical comprises a chemical coating applied along the interior surface of the component.

18. The method of claim 16, further comprising the step of injecting the chemical into the cooling medium before the step of passing.

19. The method of claim 16, wherein the chemical comprises adamantyl imide.

20. The method of claim 16, further comprising the steps of cooling the cooling medium in a heat exchanger after it has traveled through the component and pressurizing the cooling medium with a pump.

* * * * *

REEXAMINATION CERTIFICATE (4244th)
United States Patent
Twerdochlib

(10) Number: US 5,865,598 C1
(45) Certificate Issued: Jan. 2, 2001

(54) HOT SPOT DETECTION SYSTEM FOR VANES OR BLADES OF A COMBUSTION TURBINE

(75) Inventor: Michael Twerdochlib, Oviedo, FL (US)

(73) Assignee: Siemens Westinghouse Power Corporation, Orlando, FL (US)

Reexamination Request:
No. 90/005,621, Apr. 21, 2000

Reexamination Certificate for:
| | |
|---|---|
| Patent No.: | 5,865,598 |
| Issued: | Feb. 2, 1999 |
| Appl. No.: | 08/886,877 |
| Filed: | Jul. 2, 1997 |

(51) Int. Cl.$^7$ .................................................. F01B 25/26
(52) U.S. Cl. ...................... 415/118; 415/175; 415/178; 73/86
(58) Field of Search ........................... 415/115, 116, 415/118, 175, 177, 178, 179; 416/95; 73/86; 428/339, 411.1, 413, 418

(56) References Cited

U.S. PATENT DOCUMENTS

| | | | |
|---|---|---|---|
| 4,046,943 | | 9/1977 | Smith et al. ........................ 428/339 |
| 4,204,428 | * | 5/1980 | Webb et al. ........................ 73/399 |
| 4,306,835 | * | 12/1981 | Hurley ............................... 415/118 |
| 4,328,462 | * | 5/1982 | Jensen .............................. 73/86 X |
| 4,509,332 | * | 4/1985 | Bellows ......................... 415/118 X |
| 4,595,298 | * | 6/1986 | Frederick ....................... 415/118 X |
| 4,741,203 | * | 5/1988 | Willaman et al. ............. 415/118 X |
| 4,774,150 | * | 9/1988 | Amano et al. ................. 415/118 X |
| 5,181,536 | * | 1/1993 | Argyle et al. .................... 73/86 X |
| 5,211,677 | * | 5/1993 | Sargeant et al. ................ 73/86 X |
| 5,460,033 | * | 10/1995 | Vander Velde ..................... 73/86 |
| 5,552,711 | * | 9/1996 | Deegan et al. ................. 415/118 X |
| 5,554,318 | * | 9/1996 | Neumann et al. ............ 252/301.19 |
| 5,566,626 | * | 10/1996 | Schaefer et al. ................. 73/86 X |

FOREIGN PATENT DOCUMENTS

| | | |
|---|---|---|
| 3210881A1 | 3/1982 | (DE) . |
| 57-26300 | * 2/1982 | (JP) ................................. 415/118 |

* cited by examiner

Primary Examiner—John Ryznic

(57) ABSTRACT

This invention includes a detection system that can determine if a turbine component, such as a turbine vane or blade, has exceeded a critical temperature, such as a melting point, along any point along the entire surface of the vane or blade. This system can be employed in a conventional combustion turbine having a compressor, a combustor and a turbine section. Included within this system is a chemical coating disposed along the entire interior surface of a vane or blade and a closed loop cooling system that circulates a coolant through the interior of the vane or blade. If the temperature of the vane or blade exceeds a critical temperature, the chemical coating will be expelled from the vane or blade into the coolant. Since while traversing the closed loop cooling system the coolant passes through a detector, the presence of the chemical coating in the coolant will be sensed by the system. If the chemical coating is detected, this indicates that the vane or blade has exceeded a critical temperature.

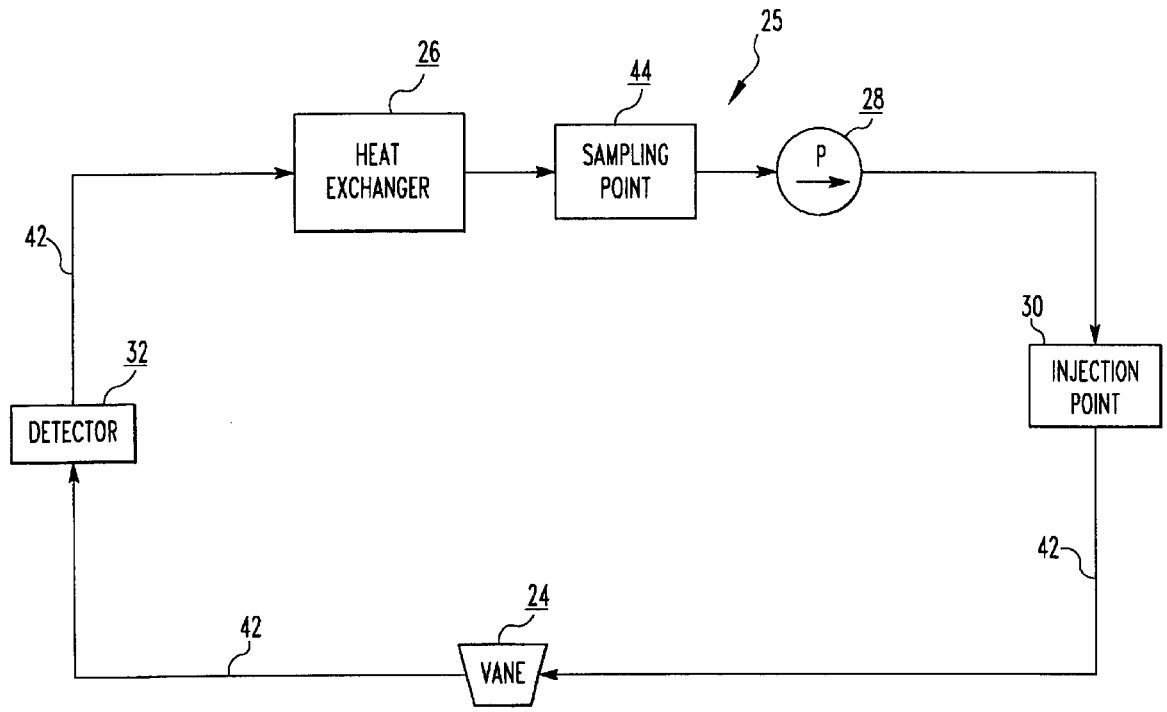

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 9 and 16 are determined to be patentable as amended.

Claims 2–8, 10–15 and 17–20, dependent on an amended claim, are determined to be patentable.

1. A detection system that detects whether a *combustion* turbine component has reached a critical temperature *of substantially equal to or over 1800° F.* at any point on a surface of the component, comprising:
    a chemical coating disposed on an interior of the component that is adapted to be expelled from the component, in the form of a particulate if the component reaches a temperature *substantially equal to or over 1800° F. that is approximately equal to the critical temperature.*

9. A detection system that detects whether a *combustion* turbine component has reached a critical temperature *of substantially equal to or over 1800° F.* at any point on a surface of the component, comprising:
    a chemical coating disposed on an interior of the component; and
    a component cooling system comprising a heat exchanger and a pump in flow communication with the interior of the component, and the chemical coating being adapted to be expelled into the cooling system in the form of a particulate if the component reaches a temperature *substantially equal to or in exess of 1800° F. that is approximately equal to the critical temperature.*

16. A method of detecting whether a *combustion* turbine component has reached a critical temperature at any point on a surface of the component, comprising:
    cooling the component by exposing an interior of the component to a cooling medium; and
    passing the cooling medium through a detector that determines if a chemical in the form of a particulate that forms at about the critical temperature, *which is approximately equal to or greater than 1800° F.* is present in the cooling medium.

* * * * *